(12) United States Patent
Alashrah

(10) Patent No.: US 12,741,336 B2
(45) Date of Patent: Sep. 22, 2026

(54) REMOVING MILL SCALE FROM A TUBULAR

(71) Applicant: Saudi Arabian Oil Company, Dhahran (SA)

(72) Inventor: Mishal M. Alashrah, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 1059 days.

(21) Appl. No.: 17/898,786

(22) Filed: Aug. 30, 2022

(65) Prior Publication Data

US 2024/0066625 A1 Feb. 29, 2024

(51) Int. Cl.

*B23K 26/00* (2014.01)
*B23K 26/16* (2006.01)
*B23K 26/40* (2014.01)
*B23K 103/04* (2006.01)

(52) U.S. Cl.

CPC .......... *B23K 26/0093* (2013.01); *B23K 26/16* (2013.01); *B23K 26/40* (2013.01); *B23K 2103/04* (2018.08)

(58) Field of Classification Search

CPC ............ B23K 2101/06; B23K 2103/04; B23K 26/0093; B23K 26/0823; B23K 26/0869; B23K 26/16; B23K 26/352; B23K 26/36; B23K 26/40

USPC .................................................... 219/121.69

See application file for complete search history.

(56) References Cited

U.S. PATENT DOCUMENTS 6,375,059 B2 * 4/2002 Ohnishi .............. B21C 37/0811 228/125
8,459,384 B2 6/2013 Niederberger
9,138,786 B2 9/2015 McKay et al.
10,301,912 B2 5/2019 De Witt et al.
10,780,469 B2 * 9/2020 McRaney .............. B08B 9/023
10,888,907 B2 1/2021 Duan
2009/0205675 A1 8/2009 Sarkar et al.

(Continued)

FOREIGN PATENT DOCUMENTS

CN 213223625 * 5/2021

OTHER PUBLICATIONS

Perret, "How does laser cleaning work in 5 steps," Aug. 15, 2020, retrieved on Aug. 26, 2022, retrieved from URL <https://www.laserax.com/blog/how-does-laser-cleaning-work>, 9 pages.

(Continued)

*Primary Examiner* — Ibrahime A Abraham
*Assistant Examiner* — Joseph W Iskra
(74) *Attorney, Agent, or Firm* — Fish & Richardson P.C.

(57) ABSTRACT

A mill scale removal system includes adjustable stands including vertical arms, horizontal arms coupled to the vertical arms, and rollers coupled to the horizontal arms and configured to support a tubular by contacting engagement with an inner radial surface or an outer radial surface at or near terminal ends of the tubular; a laser ablation system that includes at least one laser sub-assembly mounted to a rod and a first motor drivably coupled to the rod; and a rotation assembly including a second motor, a drive rod coupled to the second motor, and a rotation roller coupled to the drive rod and configured to contactingly engage the outer radial surface of the tubular.

20 Claims, 4 Drawing Sheets

(56) References Cited

U.S. PATENT DOCUMENTS

2012/0181096 A1 7/2012 Niederberger
2023/0228360 A1* 7/2023 Danko .................... F16L 55/32
73/865.8

OTHER PUBLICATIONS www.laserphotonics.com [online], "How laser cleaning works," 2022, retrieved on Aug. 26, 2022, retrieved from URL <https://www.laserphotonics.com/laser-cleaning-introductory>, 4 pages.
www.sciencedirect.com [online], "Ablation threshold," 2015, retrieved on Aug. 26, 2022, retrieved from URL <https://www.sciencedirect.com/topics/engineering/ablation-threshold>, 16 pages.
SAIP Exam in Saudi Arabian Appln No. 123450258, dated Mar. 30, 2024, 9 pages with English translation.

* cited by examiner

300

REMOVING MILL SCALE FROM A TUBULAR

TECHNICAL FIELD

The present disclosure describes apparatus, systems, and methods for removing mill scale from a tubular.

BACKGROUND

Mill scale, such as a type of iron oxide that is formed on a surface of a steel tubular (for example, pipe) during a hot-rolling process can be unwanted for the tubular's use in, for example, hydrocarbon piping or otherwise. Mill scale can form on an interior or exterior surface of the tubular. Conventionally, pipe surface cleaning methods used widely among pipe mills and coating applicators are shot blasting and sand blasting based on the extent of resurfacing level needed. These two processes impose some potential safety risks on operators and include environmental impacts on a surrounding atmosphere due to the massive, generated wastes in shape of gases and solid particles (known as abrasives).

SUMMARY

In an example implementation, a mill scale removal system includes a first adjustable stand including at least one first vertical arm, at least one first horizontal arm coupled to the at least one first vertical arm, and at least one first roller coupled to the at least one first horizontal arm and configured to at least partially support a tubular by contacting engagement with an inner radial surface or an outer radial surface at or near a first terminal end of the tubular; a second adjustable stand including at least one second vertical arm, at least one second horizontal arm coupled to the at least one second vertical arm, and at least one second roller coupled to the at least one second horizontal arm and configured to at least partially support the tubular by contacting engagement with the inner radial surface or the outer radial surface at or near a second terminal end of the tubular; a laser ablation system that includes at least one laser sub-assembly mounted to a rod and a first motor drivably coupled to the rod, the at least one laser sub-assembly including a laser source configured to output a laser having a laser intensity sufficient to remove at least one mill scale layer formed on the inner radial surface or the outer radial surface at a particular laser ablation threshold; and a rotation assembly including a second motor, a drive rod coupled to the second motor, and at least one rotation roller coupled to the drive rod and configured to contactingly engage the outer radial surface of the tubular, the second motor configured to drivably rotate the drive rod to facilitate rotation of the tubular about a centerline axis through rotation of the at least one rotation roller by the drive rod.

In an aspect combinable with the example implementation, the laser intensity is insufficient to alter a material property of a material of the tubular.

In another aspect combinable with any of the previous aspects, the material of the tubular includes carbon steel.

In another aspect combinable with any of the previous aspects, the first motor is configured to drivably rotate the rod to facilitate linear motion of the at least one laser sub-assembly in parallel with the centerline axis between the first and second terminal ends of the tubular.

In another aspect combinable with any of the previous aspects, the first motor is configured to drivably rotate the rod to facilitate linear motion of the at least one laser sub-assembly at a particular linear speed, and the second motor is configured to drivably rotate the drive rod to facilitate rotation of the tubular about the centerline axis at a particular rotational speed in combination with the particular linear speed.

In another aspect combinable with any of the previous aspects, the at least one laser sub-assembly includes a suction tube configured to vacuum the removed at least one mill scale layer away from the inner radial surface or the outer radial surface.

In another aspect combinable with any of the previous aspects, the at least one first roller coupled to the at least one first horizontal arm is configured to at least partially support the tubular by contacting engagement with the inner radial surface at or near the first terminal end of the tubular.

In another aspect combinable with any of the previous aspects, the at least one second roller coupled to the at least one second horizontal arm is configured to at least partially support the tubular by contacting engagement with the inner radial surface at or near the second terminal end of the tubular.

In another aspect combinable with any of the previous aspects, the laser ablation system is a first laser ablation system, with the rod coupled to the first and second vertical arms through a bore of the tubular and the laser source is mounted on the rod to output the laser the laser intensity sufficient to remove the at least one mill scale layer formed on the inner radial surface at the particular laser ablation threshold.

Another aspect combinable with any of the previous aspects further includes at least one third horizontal arm and at least one third roller coupled to the at least one third horizontal arm and configured to at least partially support the tubular by contacting engagement with the outer radial surface at or near the first terminal end of the tubular; at least one fourth horizontal arm and at least one fourth roller coupled to the at least one fourth horizontal arm and configured to at least partially support the tubular by contacting engagement with the outer radial surface at or near the second terminal end of the tubular; and a second laser ablation system that includes at least one second laser sub-assembly mounted to a second rod and a second motor drivably coupled to the second rod, the at least one second laser sub-assembly including a second laser source configured to output a second laser having the laser intensity sufficient to remove at least one mill scale layer formed on the outer radial surface at the particular laser ablation threshold.

Another aspect combinable with any of the previous aspects further includes a control system communicably coupled to the first and second motors and configured to perform operations including operating the first motor at a first speed to drive the at least one laser sub-assembly on the rod at a first linear speed between the first and second terminal ends; and operating the second motor at a second speed to drive the at least one rotation roller on the drive rod at a first rotational speed to rotate the tubular about the centerline axis.

In another aspect combinable with any of the previous aspects, the control system is configured to perform operations including determining a change to one of the first speed or the second speed; and in response to the determination, adjusting one of the first motor or the second motor to adjust the other of the first speed or the second speed.

In another example implementation, a method for removing mill scale from a tubular includes at least partially mounting the tubular on a first adjustable stand including at least one first vertical arm, at least one first horizontal arm coupled to the at least one first vertical arm, and at least one first roller coupled to the at least one first horizontal arm such that the at least one first roller contactingly engages an inner radial surface or an outer radial surface at or near a first terminal end of the tubular; at least partially mounting the tubular on a second adjustable stand including at least one second vertical arm, at least one second horizontal arm coupled to the at least one second vertical arm, and at least one second roller coupled to the at least one first horizontal arm such that the at least one first roller contactingly engages an inner radial surface or an outer radial surface at or near a second terminal end of the tubular; operating a first motor to drive a rod coupled to the first motor and to at least one laser sub-assembly to linearly move the at least one laser sub-assembly on the rod between the first and second terminal ends; during linear movement of the at least one laser sub-assembly, operating a laser source of the laser sub-assembly to output a laser having a laser intensity sufficient to remove at least one mill scale layer formed on the inner radial surface or the outer radial surface at a particular laser ablation threshold; and during linear movement of the at least one laser sub-assembly, operating a second motor to drive a drive rod coupled to the second motor and to at least one rotation roller contactingly engaged with the outer radial surface of the tubular to facilitate rotation of the tubular about a centerline axis through rotation of the at least one rotation roller by the drive rod.

In an aspect combinable with the example implementation, operating the laser source includes operating the laser source at the laser intensity that is insufficient to alter a material property of a material of the tubular.

In another aspect combinable with any of the previous aspects, the material of the tubular includes carbon steel.

Another aspect combinable with any of the previous aspects further includes operating the first motor to drivably rotate the rod to linearly move the at least one laser sub-assembly in parallel with the centerline axis between the first and second terminal ends of the tubular.

Another aspect combinable with any of the previous aspects further includes operating the first motor to drivably rotate the rod to linearly move the at least one laser sub-assembly at a particular linear speed; and operating the second motor to drivably rotate the drive rod to rotate the tubular about the centerline axis at a particular rotational speed in combination with the particular linear speed.

Another aspect combinable with any of the previous aspects further includes vacuuming, with a suction tube of the at least one laser sub-assembly, the removed at least one mill scale layer away from the inner radial surface or the outer radial surface.

In another aspect combinable with any of the previous aspects, the at least one first roller coupled to the at least one first horizontal arm is configured to at least partially support the tubular by contacting engagement with the inner radial surface at or near the first terminal end of the tubular.

In another aspect combinable with any of the previous aspects, the at least one second roller coupled to the at least one second horizontal arm is configured to at least partially support the tubular by contacting engagement with the inner radial surface at or near the second terminal end of the tubular.

In another aspect combinable with any of the previous aspects, operating the first motor to drive the rod includes operating the first motor to drive the rod coupled to the first motor and to at least one laser sub-assembly to linearly move the at least one laser sub-assembly on the rod between the first and second terminal ends within a bore of the tubular.

Another aspect combinable with any of the previous aspects further includes at least partially engaging the tubular on at least one third horizontal arm coupled to at least one third roller contactingly engaged with the outer radial surface at or near the first terminal end of the tubular; at least partially engaging the tubular on at least one fourth horizontal arm coupled to at least one fourth roller contactingly engaged with the outer radial surface at or near the second terminal end of the tubular; operating a third motor to drive a second rod coupled to the third motor and to at least another laser sub-assembly to linearly move the at least another laser sub-assembly on the second rod between the first and second terminal ends; and during linear movement of the at least another laser sub-assembly, operating another laser source of the another laser sub-assembly to output another laser having the laser intensity sufficient to remove at least one mill scale layer formed on the outer radial surface at the particular laser ablation threshold.

Another aspect combinable with any of the previous aspects further includes operating the first motor at a first speed to drive the at least one laser sub-assembly on the rod at a first linear speed between the first and second terminal ends; and operating the second motor at a second speed to drive the at least one rotation roller on the drive rod at a first rotational speed to rotate the tubular about the centerline axis.

Another aspect combinable with any of the previous aspects further includes determining a change to one of the first speed or the second speed; and in response to the determination, adjusting one of the first motor or the second motor to adjust the other of the first speed or the second speed.

Implementations of apparatus, systems, and methods for removing mill scale from a tubular according to the present disclosure may include one or more of the following features. For example, use of laser beam descaling can be a more efficient and safer solution to the traditional oxides removal processes like shot blasting and sand. As another example, apparatus, systems, and methods for removing mill scale from a tubular according to the present disclosure can be used to remove defective paint layers from coated pipes based on a selected laser ablation threshold level for the targeted work surface. Further, apparatus, systems, and methods for removing mill scale from a tubular according to the present disclosure can utilize a customized laser solution to provide adequate service of various surface refinement options for metallic pipes. Also, apparatus, systems, and methods for removing mill scale from a tubular according to the present disclosure can resolve the undermining of pipe coating applications and weld seam performance on carbon steel pipe due to the presence of mill scale.

The details of one or more implementations of the subject matter described in this disclosure are set forth in the accompanying drawings and the description below. Other features, aspects, and advantages of the subject matter will become apparent from the description, the drawings, and the claims.

DETAILED DESCRIPTION

Figure 1A:
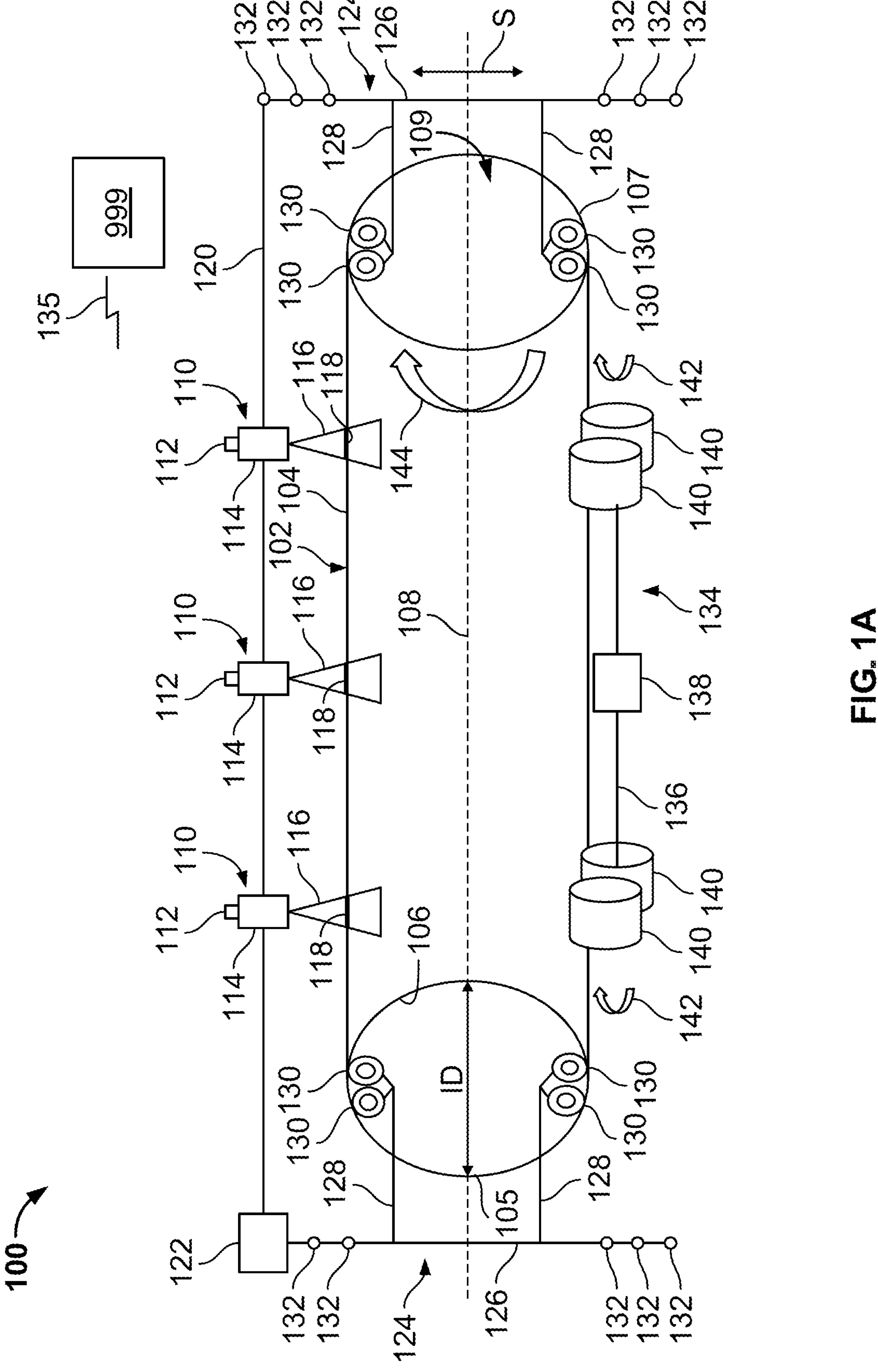
FIG. 1A is a schematic diagram of an example implementation of a mill scale removal system operable to remove at least a portion of mill scale from an exterior surface of a tubular according to the present disclosure.

FIG. 1A is a schematic diagram of an example implementation of a mill scale removal system 100 operable to remove at least a portion of mill scale 118 from an exterior surface (radial) 104 of a tubular 102. Generally, the example mill scale removal system 100 is operable to remove mill scale 118 with one or more laser assemblies 110 that, for instance, can be implemented as an additional stage along a route of a manufacturing process of a seamless pipe for example, a carbon steel pipe), such as after a rotary furnace stage (and more particularly after completing a hot rolling process followed by relevant heat treatment cycles) where the seamless pipe is heat-treated for better material performance. The mill scale removal system 100 can receive and smoothly admit a tubular pipe in a continuous manner and subsequently remove formatted surface impurities (such as mill scale) resulting from heat-treatment cycles found on the pipe's external and internal surfaces. In some aspects, the one or more laser assemblies 110 can apply a focused laser beam at various intensities based on the targeted material (for example, carbon steel) laser ablation threshold. However, the introduced laser may not alter material properties of the pipe no matter how long the laser beam is kept focused on the surface of the pipe as long as the laser intensity is less than the base metal ablation threshold.

In this example implementation, the mill scale removal system 100 includes a rod 120 onto which the one or more laser assemblies 110 are mounted. In this example, the rod 120 is mounted adjacent to the exterior surface 104 of the tubular 102 (in other words, external to a bore 109 of the tubular 102) so that the laser assemblies 110 can remove mill scale 118 from the exterior surface 104. In this example, each laser assembly 110 includes a laser source 112 operable to generate a laser beam 116 onto the external surface 104 through a suction tube 114. In this example, the laser source 112 emits the laser beam 116 at a certain intensity level, which defines an ability of the laser beam 116 (for example, as a pulsed wave at relatively high intensity) to burn through the mill scale 118 as measured by an amount of power (Watts) that the laser assembly 110 is able to produce. The ability of burning through a specific material layer (such as the mill scale 118) is determined by the respective ablation threshold. Once the laser beam 116 hits the external surface 104, the beam 116 burns any material layer (of which the mill scale 118 can include several) with an ablation threshold intensity less than a set level of the laser source 112). The ablation level of any particular laser assembly 110 can be set of a targeted material layer (or layers) of the mill scale 118, but less than the ablation level of the material of which the tubular 102 is made.

An ablation threshold is an amount of energy required to completely remove contaminations from a certain area, measured in Joules per square centimeter. There is an ablation threshold for each material. Thus, the set laser intensity level of the laser beam 116 can be set to discriminate between two or more materials (for example, the mill scale 118 and the material of the tubular 102). Since there can be a sufficiently large ablation threshold difference between these materials, the mill scale 118 can be removed (as it has a lower ablation threshold) while leaving the material of the tubular 102 unscathed or unchanged.

Figure 2:
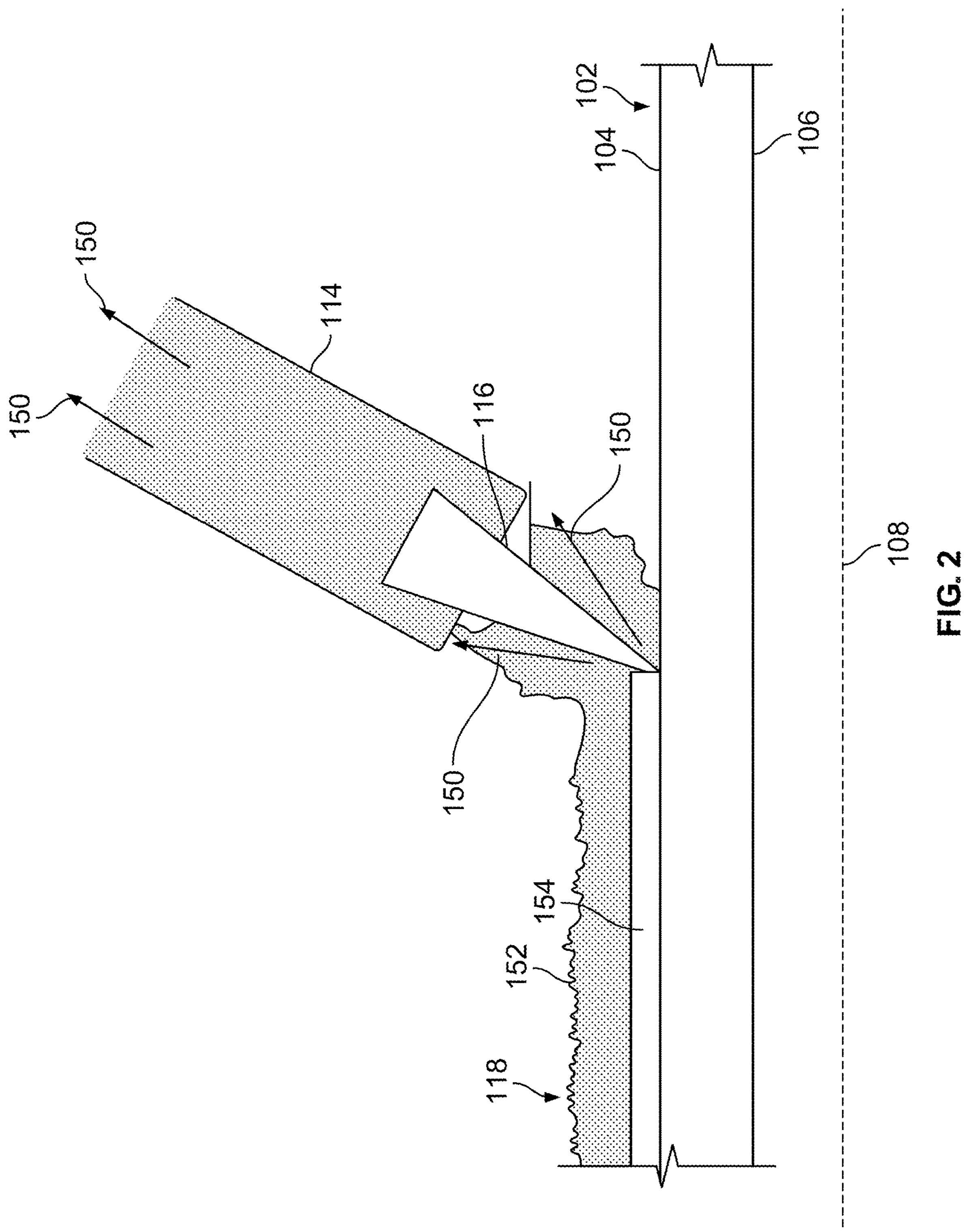
FIG. 2 is a schematic illustration of mill scale removal by a laser descaling tool that is part of an example implementation of a mill scale removal system according to the present disclosure.

In this example of the laser assembly 110, the suction tube 114 provides a vacuum suction channel (for example, fluidly coupled to a vacuum) that removes resulted gases and fine particles of the mill scale 118 during the laser ablation. Such gas or very fine particles are subsequently sucked out through the suction tube 114 and removed to a location for disposal. Turning to FIG. 2, a schematic diagram of the suction tube 114 and laser beam 116 during operation is shown. Here, the laser beam 116 is applied to the exterior surface 104 of the tubular 102 to ablate the mill scale 118. In this example, the mill scale 118 can be comprised of a corrosion layer 152 and an oxide layer 154, both of which have an ablation threshold less than an ablation threshold of the tubular 102, itself. In this example, therefore, the laser beam 116 can be set above the ablation level of layers 152 and 154, but below the ablation level of the tubular 102. As shown, ablation of the mill scale 118 creates gasses/particles 150, which are subsequently sucked into the suction tube 114 (and removed for disposal).

Returning to FIG. 1A, laser assemblies 110 are mounted on the rod 120, which in turn is drivably coupled to a motor 122. The rod 120 (and possibly motor 122) are coupled to adjustable stands 124 that are positioned, in this example implementation, at opposite terminal ends 105 and 107 (one or both which may be open) of the tubular 102. For example, as shown in this example, the motor 122 can be mounted to a vertical arm 126 of one adjustable stand 124, while another end of the rod 120 can be coupled to one pin hole 132 of several pin holes 132 formed on one or both of the vertical arms 126 of the adjustable stands 124. As there can be many pin holes 132, the rod 120 (and motor 122) can be mounted at any of several distances away from the exterior surface 104 of the tubular 102 (thereby also placing the laser assemblies 110 at any of several distances away from the exterior surface 104 of the tubular 102).

In this example, the tubular 102 is contactingly engaged with rollers 130 that are coupled to horizontal arms 128 of each adjustable stand 124. In this example, the horizontal arms 128 can be positionally adjusted along the vertical arm 126 (for example, at different pin holes 132 or otherwise) to adjust a spacing, "S" between the arms 128. S can be adjusted (by adjusting the arms 128) to account for tubulars 102 of different internal diameters, "ID."

Generally, the adjustable stands 124 allow the rod 120 to be set at a specific orientation with respect to a circumference of the tubular 102 (for example, parallel to centerline axis 108) in order to allocate (for example, exactly) start and end points to maintain a straight line motion for the laser assemblies 110 across a longitudinal axis of the tubular 102. The motor 122, in this example, is operable to facilitate the straight linear motion of the laser assemblies 110 (for example, with simultaneously movement) along the rod 120. Motion of the laser assemblies 110 can be performed, for example, by operation of the motor 122 to rotate or spin the rod 120. The vertical arms 126 each include pin holes 132; in some aspects, these are spaced equally across to connect the rod 120 at a certain level from the surface 104.

In this example implementation of the mill scale removal system 100, a rotation assembly 134 is provided to facilitate rotation of the tubular 102 about its axis 108 during operation of the laser assemblies 110 (for example, as they move in a straight line motion along rod 120) in order to ablate mill scale 118 about the surface 104. In this example, the rotation assembly 134 includes a motor 138 drivably coupled to rollers 140 (in this example, two sets of pairs of rollers 140) through drive rod 136. As motor 138 operates to transfer rotational motion from itself, through the drive rod 136, and to the rollers 140, rotation 142 is generated and transferred to the tubular 102 as rotation 144 (also facilitated by rollers 130). In some aspects, motor 122 and motor 138 can be implemented as a single motor that can drive both rods 120 and 136.

In some aspects, operation of motor 122 (for example, to control a linear speed of the laser assemblies 110 on the rod 120 in a direction parallel to axis 108) and operation of motor 138 (for example, to control a rotational speed of the tubular 102 about axis 108) can be independent (such as manual). However, coordination of the linear speed and rotational speed can provide for optimum proportional motion between the linear motion of rod 120 and the rotary motion of tubular 102 for an advantageous and effective descaling process. In some aspects, for instance, a control system 999 (or controller 999, such as a microprocessor based controller) can be in communication 135 (wired or wireless) with one or more components of the mill scale removal system 100, such as, for example, motors 122 and 138. For example, control system 999 can provide commands to the motors 122 and 138 (for example, to turn on or off or adjust a speed), as well as receive feedback from the motors 122 and 138 (for example, speed or torque or otherwise).

In some aspects, the control system 999 can coordinate operation of the motors 122 and 138 (and, for instance, laser assemblies 110) such that the linear speed of the laser assemblies 110 (as governed by motor 122) is consistent with the rotational speed of the tubular 102 (as governed by motor 138) to effectively remove all or most mill scale 118 on the exterior surface 104 of the tubular 102 (in a single or multiple pass operation of the laser assemblies 110 between the terminal ends 105 and 107 of the tubular 102). In some aspects, the control system 999 can coordinate the linear speed of the laser assemblies 110 and the rotational speed of the tubular 102 by determining a particular one of the speeds (for example, linear or rotational) and then adjusting the other of the speeds (linear or rotational) through operational control of the motors 122 and 138 so as to ensure that the linear speed and rotational speed are consistent to effectively remove all or most mill scale 118 on the external surface 104 of the tubular 102.

In an example operation of the mill scale removal system 100, the adjustable stands 124 are positioned at the terminal ends 105 and 107 of the tubular 102 as shown. Next, horizontal arms 128 can be positioned or adjusted (for example, on pin holes 132) on the vertical arms 126 such that rollers 130 are contactingly engaged with an interior surface (radial) 106 of the tubular 102 (as shown). Next, the rod 120 (on which the laser assemblies 110 are mounted) is inserted in pin-holes 132 such that S is at a desired value (for example, to set the distance between the laser assemblies 110 and the exterior surface 104). Next, a laser intensity of the laser sources 112 can be set to be less than an ablation threshold of the tubular 102, but more than that of the mill scale 118. The laser sources 112 can be coupled to respective suction tubes 114 in order to remove resulting ablated gasses and particles as described. Next, the rod 120 can be connected to motor 122 that facilitates the straight linear motion (for example, bidirectional) of the laser assemblies 110 in parallel with axis 108. The motor 122 can be selected or controlled to maintain enough sliding speed consistent with the tubular's rotational speed. In combination with movement of the laser assemblies 110, rotation of the tubular 102 about axis 108 is facilitated by operation of the motor 138 to drive rollers 140 to provide rotation 142 (and thus, rotation 144). During rotation, laser assemblies 110 can be operated to linearly move while applying laser beam 116 to the surface 104 to ablate the mill scale 118.

Figure 1B:
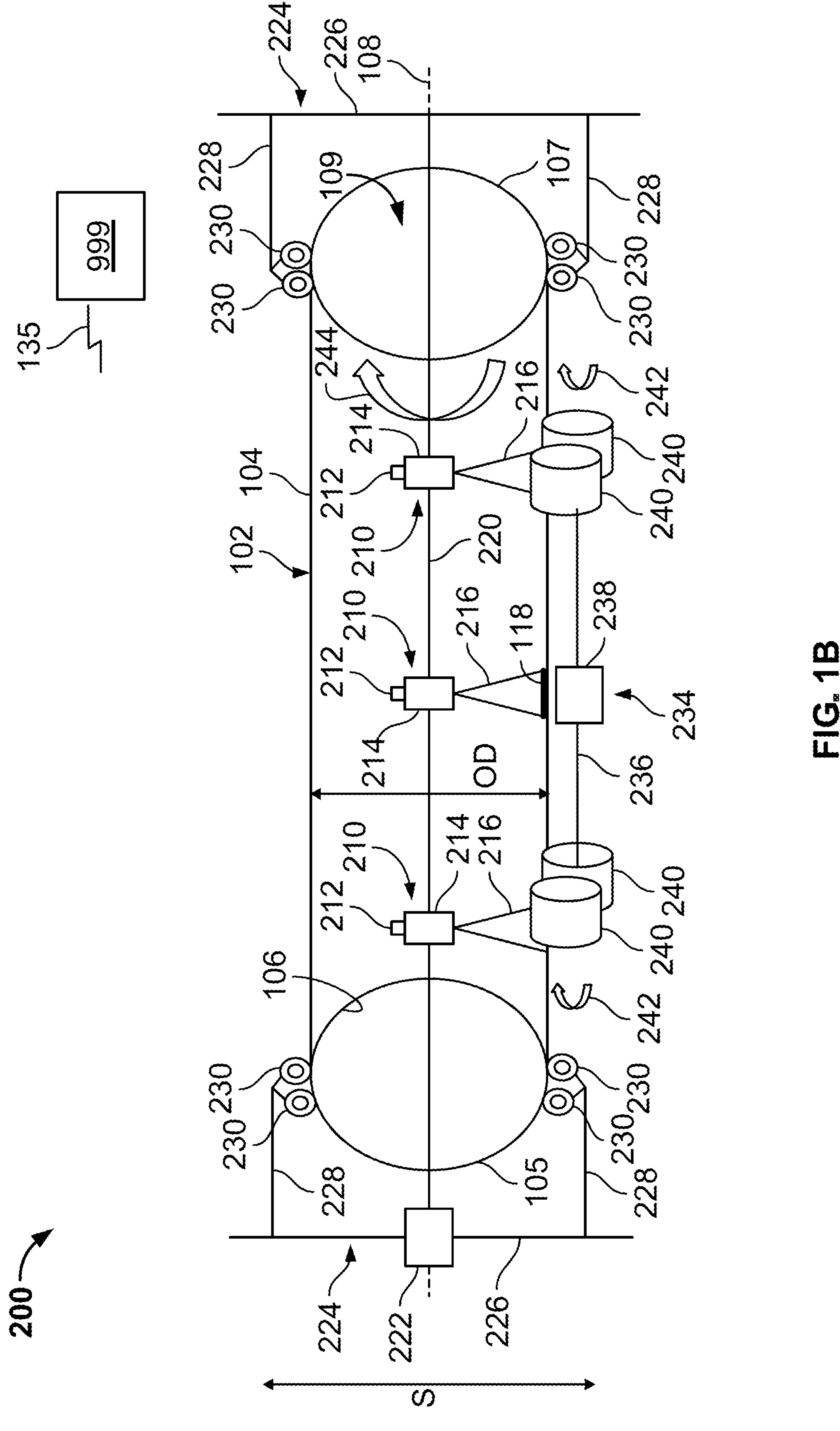
FIG. 1B is a schematic diagram of an example implementation of a mill scale removal system operable to remove at least a portion of mill scale from an interior surface of a tubular according to the present disclosure.

FIG. 1B is a schematic diagram of another example implementation of a mill scale removal system 200 operable to remove at least a portion of mill scale 118 from the internal surface 106 of the tubular 102. Generally, the example mill scale removal system 200, like the example mill scale removal system 100, is operable to remove mill scale 118 with one or more laser assemblies 210 that, for instance, can be implemented as an additional stage along a route of a manufacturing process of a seamless pipe for example, a carbon steel pipe), such as after a rotary furnace stage (and more particularly after completing a hot rolling process followed by relevant heat treatment cycles) where the seamless pipe is heat-treated for better material performance. The mill scale removal system 200 can receive and smoothly admit a tubular pipe in a continuous manner and subsequently remove formatted surface impurities (such as mill scale) resulting from heat-treatment cycles found on the pipe's external and internal surfaces. In some aspects, the one or more laser assemblies 210 can apply a focused laser beam at various intensities based on the targeted material (for example, carbon steel) laser ablation threshold. However, the introduced laser may not alter material properties of the pipe no matter how long the laser beam is kept focused on the surface of the pipe as long as the laser intensity is less than the base metal ablation threshold.

In this example implementation, the mill scale removal system 200 includes a rod 220 onto which the one or more laser assemblies 210 are mounted. In this example, the rod 220 is mounted adjacent to the internal surface 106 of the tubular 102 (in other words, within the bore 109 of the tubular 102) so that the laser assemblies 210 can remove mill scale 118 from the internal surface 106. In this example, each laser assembly 210 includes a laser source 212 operable to generate a laser beam 216 onto the internal surface 106 through a suction tube 214. In this example, the laser source 212 emits the laser beam 216 at a certain intensity level, which defines an ability of the laser beam 216 (for example, as a pulsed wave at relatively high intensity) to burn through the mill scale 118 as measured by an amount of power (Watts) that the laser source 210 is able to produce. The ability of burning through a specific material layer (such as the mill scale 118) is determined by the respective ablation threshold. Once the laser beam 216 hits the internal surface 106, the beam 216 burns any material layer (of which the mill scale 118 can include several) with an ablation threshold intensity less than a set level of the laser source 212). The ablation level of any particular laser assembly 210 can be set of a targeted material layer (or layers) of the mill scale 118, but less than the ablation level of the material of which the tubular 102 is made.

The set laser intensity level of the laser beam 216 can be set to discriminate between two or more materials (for example, the mill scale 118 and the material of the tubular 102). Since there can be a sufficiently large ablation threshold difference between these materials, the mill scale 118 can be removed (as it has a lower ablation threshold) while leaving the material of the tubular 102 unscathed or unchanged.

In this example of the laser assembly 210, the suction tube 214 provides a vacuum suction channel (for example, fluidly coupled to a vacuum) that removes resulted gases and fine particles of the mill scale 118 during the laser ablation. Such gas or very fine particles are subsequently sucked out through the suction tube 214 and removed to a location for disposal. The laser beam 216 is applied to the internal surface 106 of the tubular 102 to ablate the mill scale 118. As previously described, the mill scale 118 can be comprised of a corrosion layer and an oxide layer, both of which have an ablation threshold less than an ablation threshold of the tubular 102, itself. In this example, therefore, the laser beam 116 can be set above the ablation level of layers, but below the ablation level of the tubular 102. Ablation of the mill scale 118 creates gasses/particles, which are subsequently sucked into the suction tube 214 (and removed for disposal).

Returning to FIG. 1B, laser assemblies 210 are mounted on the rod 220, which in turn is drivably coupled to a motor 222. The rod 220 (and possibly motor 222) are coupled to adjustable stands 224 that are positioned, in this example implementation, at opposite terminal ends 105 and 107 (one or both of which may be open) of the tubular 102. For example, as shown in this example, the motor 222 can be mounted to a vertical arm 226 of one adjustable stand 224, while another end of the rod 220 can be coupled to one pin hole 232 of several pin holes 232 formed on one or both of the vertical arms 226 of the adjustable stands 224. As there can be many pin holes 232, the rod 220 (and motor 222) can be mounted at the axis 108 or at any of several distances away from the axis 108 of the tubular 102 (thereby also placing the laser assemblies 210 at any of several distances away from the internal surface 106 of the tubular 102).

In this example, the tubular 102 is contactingly engaged with rollers 230 that are coupled to horizontal arms 228 of each adjustable stand 224. In this example, the horizontal arms 228 can be positionally adjusted along the vertical arm 226 (for example, at different pin holes 232 or otherwise) to adjust a spacing, "S" between the arms 228. S can be adjusted (by adjusting the arms 228) to account for tubulars 102 of different external diameters, "OD."

Generally, the adjustable stands 224 allow the rod 220 to be set at a specific orientation with respect to a circumference of the tubular 102 (for example, parallel to centerline axis 108) in order to allocate (for example, exactly) start and end points to maintain a straight line motion for the laser assemblies 210 across axis 108 of the tubular 102. The motor 222, in this example, is operable to facilitate the straight linear motion of the laser assemblies 210 (for example, with simultaneously movement) along the rod 220. Motion of the laser assemblies 210 can be performed, for example, by operation of the motor 222 to rotate or spin the rod 220. The vertical arms 226 each include pin holes 232; in some aspects, these are spaced equally across to connect the rod 220 at a certain level from the surface 106.

In this example implementation of the mill scale removal system 200, a rotation assembly 234 is provided to facilitate rotation of the tubular 102 about its axis 108 during operation of the laser assemblies 210 (for example, as they move in a straight line motion along rod 220) in order to ablate mill scale 118 about the surface 106. In this example, the rotation assembly 234 includes a motor 238 drivably coupled to rollers 240 (in this example, two sets of pairs of rollers 240) through drive rod 236. As motor 238 operates to transfer rotational motion from itself, through the drive rod 236, and to the rollers 240, rotation 242 is generated and transferred to the tubular 102 as rotation 244 (also facilitated by rollers 230). In some aspects, motor 222 and motor 238 can be implemented as a single motor that can drive both rods 120 and 136.

In some aspects, operation of motor 222 (for example, to control a linear speed of the laser assemblies 210 on the rod 220 in a direction parallel to axis 108) and operation of motor 238 (for example, to control a rotational speed of the tubular 102 about axis 108) can be independent (such as manual). However, coordination of the linear speed and rotational speed can provide for optimum proportional motion between the linear motion of rod 220 and the rotary motion of tubular 102 for an advantageous and effective descaling process. In some aspects, for instance, the control system 999 can be in communication 235 (wired or wireless) with one or more components of the mill scale removal system 200, such as, for example, motors 222 and 238. For example, control system 999 can provide commands to the motors 222 and 238 (for example, to turn on or off or adjust a speed), as well as receive feedback from the motors 222 and 238 (for example, speed or torque or otherwise).

In some aspects, the control system 999 can coordinate operation of the motors 222 and 238 (and, for instance, laser assemblies 210) such that the linear speed of the laser assemblies 210 (as governed by motor 222) is consistent with the rotational speed of the tubular 102 (as governed by motor 238) to effectively remove all or most mill scale 118 on the internal surface 106 of the tubular 102 (in a single or multiple pass operation of the laser assemblies 210 between the terminal ends 105 and 107 of the tubular 102). In some aspects, the control system 999 can coordinate the linear speed of the laser assemblies 210 and the rotational speed of the tubular 102 by determining a particular one of the speeds (for example, linear or rotational) and then adjusting the other of the speeds (linear or rotational) through operational control of the motors 222 and 238 so as to ensure that the linear speed and rotational speed are consistent to effectively remove all or most mill scale 118 on the internal surface 106 of the tubular 102.

In an example operation of the mill scale removal system 200, the adjustable stands 224 are positioned at the terminal ends 105 and 107 of the tubular 102 as shown. Next, horizontal arms 228 can be positioned or adjusted (for example, on pin holes 232) on the vertical arms 226 such that rollers 230 are contactingly engaged with the external surface 104 of the tubular 102 (as shown). Next, the rod 220 (on which the laser assemblies 210 are mounted) is inserted in pin-holes 232 such that S is at a desired value (for example, to set the distance between the laser assemblies 210 and the internal surface 106). Next, a laser intensity of the laser sources 212 can be set to be less than an ablation threshold of the tubular 102, but more than that of the mill scale 118. The laser sources 212 can be coupled to respective suction tubes 214 in order to remove resulting ablated gasses and particles as described. Next, the rod 220 can be connected to motor 222 that facilitates the straight linear motion (for example, bidirectional) of the laser assemblies 210 in parallel with axis 108. The motor 222 can be selected or controlled to maintain enough sliding speed consistent with the tubular's rotational speed. In combination with movement of the laser assemblies 210, rotation of the tubular 102 about axis 108 is facilitated by operation of the motor 238 to drive rollers 240 to provide rotation 242 (and thus, rotation 244). During rotation, laser assemblies 210 can be operated to linearly move while applying laser beam 216 to the surface 106 to ablate the mill scale 118.

In some aspects, the example implementations of the mill scale removal systems 100 and 200 can be used in combination to, for example, simultaneously remove mill scale from the external surface 104 and internal surface 106 of the tubular 102. For example, a single rotational assembly (for example, rotation assembly 134 or 234) can be used to rotate the tubular 102. Further, pairs of adjustable stands 124 and 224, along with rods 120 and 220 (and motors 122 and 222) can be used in combination along with sets of laser assemblies 110 and 210. Coordination of the linear movement of the laser assemblies 110 and 210 (external to and internal to the tubular 102, respectively) can be coordinated with each other and with the rotational movement of the tubular 102 caused by the rotation assembly. In some aspects, there can be two adjustable stands (one at each terminal end 105 and 107) with two pairs of horizontal arms coupled to respective single vertical arms. One pair of horizontal arms (on each terminal end) can have rollers in contacting engagement with the inner surface 106, while another pair of horizontal arms (on each terminal end) can have rollers in contacting engagement with the outer surface 104.

Figure 3:
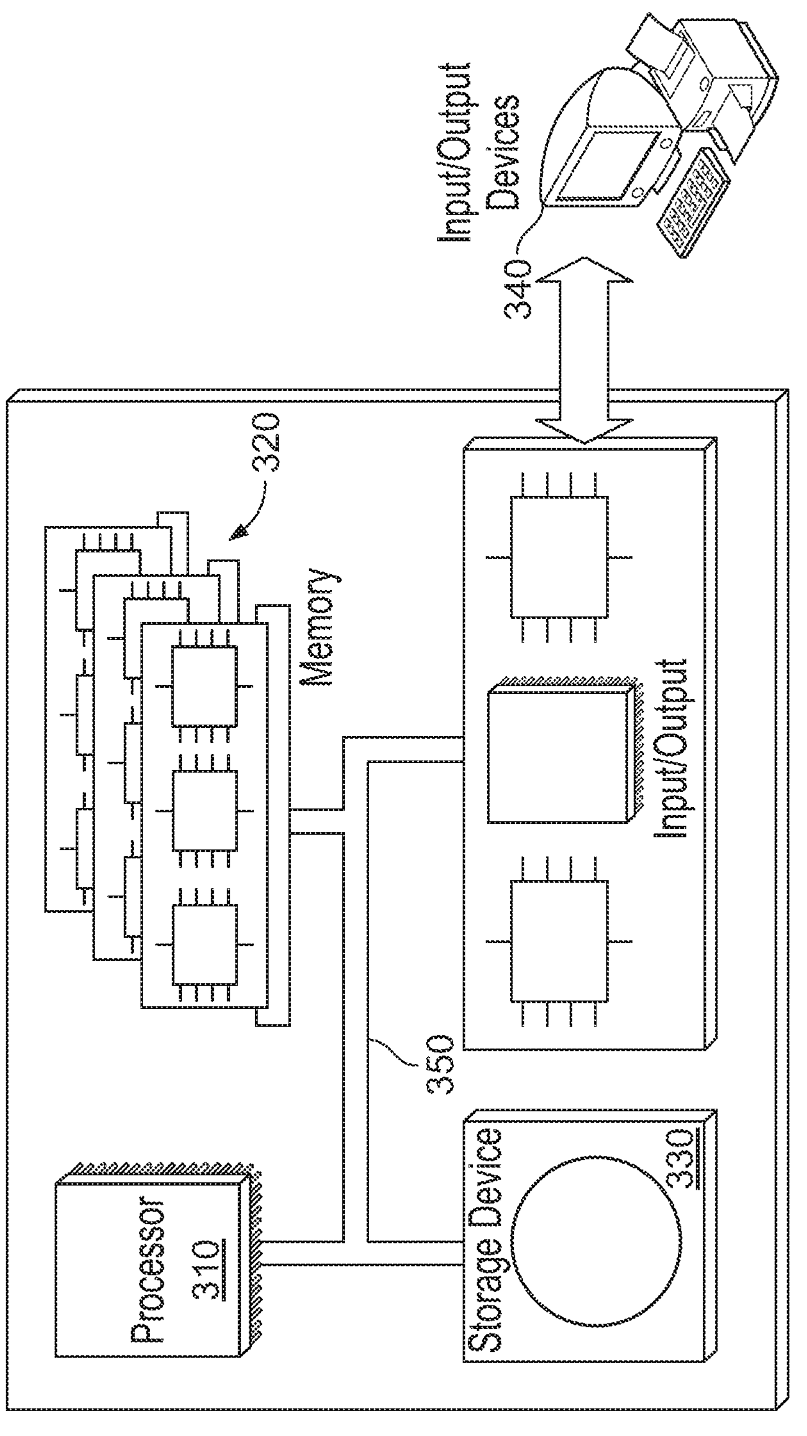
FIG. 3 is a schematic diagram of an example control system for a mill scale removal system according to the present disclosure.

FIG. 3 is a schematic diagram of a control system 300. The control system 300 can be used as control system 999, in some aspects, for the operations described in association with any of the example operations described previously. The system 300 is intended to include various forms of digital computers, such as laptops, desktops, workstations, personal digital assistants, servers, blade servers, mainframes, and other appropriate computers. The system 300 can also include mobile devices, such as personal digital assistants, cellular telephones, smartphones, and other similar computing devices. Additionally the system can include portable storage media, such as, Universal Serial Bus (USB) flash drives. For example, the USB flash drives may store operating systems and other applications. The USB flash drives can include input/output components, such as a wireless transmitter or USB connector that may be inserted into a USB port of another computing device.

The system 300 includes a processor 310, a memory 320, a storage device 330, and an input/output device 340. Each of the components 310, 320, 330, and 340 are interconnected using a system bus 350. The processor 310 is capable of processing instructions for execution within the system 300. The processor may be designed using any of a number of architectures. For example, the processor 310 may be a CISC (Complex Instruction Set Computers) processor, a RISC (Reduced Instruction Set Computer) processor, or a MISC (Minimal Instruction Set Computer) processor.

In one implementation, the processor 310 is a single-threaded processor. In some implementations, the processor 310 is a multi-threaded processor. The processor 310 is capable of processing instructions stored in the memory 320 or on the storage device 330 to display graphical information for a user interface on the input/output device 340.

The memory 320 stores information within the system 300. In one implementation, the memory 320 is a computer-readable medium. In one implementation, the memory 320 is a volatile memory unit. In some implementations, the memory 320 is a non-volatile memory unit.

The storage device 330 is capable of providing mass storage for the system 300. In one implementation, the storage device 330 is a computer-readable medium. In various different implementations, the storage device 330 may be a floppy disk device, a hard disk device, an optical disk device, or a tape device.

The input/output device 340 provides input/output operations for the system 300. In one implementation, the input/output device 340 includes a keyboard and/or pointing device. In some implementations, the input/output device 340 includes a display unit for displaying graphical user interfaces.

Certain features described can be implemented in digital electronic circuitry, or in computer hardware, firmware, software, or in combinations of them. The apparatus can be implemented in a computer program product tangibly embodied in an information carrier, e.g., in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer. Additionally, such activities can be implemented via touchscreen flat-panel displays and other appropriate mechanisms.

The features can be implemented in a control system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a local area network ("LAN"), a wide area network ("WAN"), peer-to-peer networks (having ad-hoc or static members), grid computing infrastructures, and the Internet.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

A number of implementations have been described. Nevertheless, it will be understood that various modifications may be made without departing from the spirit and scope of the disclosure. For example, example operations, methods, or processes described herein may include more steps or fewer steps than those described. Further, the steps in such example operations, methods, or processes may be performed in different successions than that described or illustrated in the figures. Accordingly, other implementations are within the scope of the following claims.

What is claimed is:

1. A mill scale removal system, comprising:

a first adjustable stand comprising at least one first vertical arm, at least one first horizontal arm coupled to the at least one first vertical arm, and at least one first roller coupled to the at least one first horizontal arm and configured to at least partially support a tubular by contacting engagement with an inner radial surface at or near a first terminal end of the tubular;

a second adjustable stand comprising at least one second vertical arm, at least one second horizontal arm coupled to the at least one second vertical arm, and at least one second roller coupled to the at least one second horizontal arm and configured to at least partially support the tubular by contacting engagement with the inner radial surface at or near a second terminal end of the tubular;

a laser ablation system that comprises at least one laser sub-assembly mounted to a rod and a first motor drivably coupled to the rod, the at least one laser sub-assembly comprising a laser source configured to output a laser having a laser intensity sufficient to remove at least one mill scale layer formed on the outer radial surface at a particular laser ablation threshold; and a rotation assembly comprising a second motor, a drive rod coupled to the second motor, and at least one rotation roller coupled to the drive rod and configured to contactingly engage the outer radial surface of the tubular, the second motor configured to drivably rotate the drive rod to facilitate rotation of the tubular about a centerline axis through rotation of the at least one rotation roller by the drive rod.

2. The mill scale removal system of claim 1, wherein the laser intensity is insufficient to alter a material property of a material of the tubular.

3. The mill scale removal system of claim 2, wherein the material of the tubular comprises carbon steel.

4. The mill scale removal system of claim 1, wherein the first motor is configured to drivably rotate the rod to facilitate linear motion of the at least one laser sub-assembly in parallel with the centerline axis between the first and second terminal ends of the tubular.

5. The mill scale removal system of claim 4, wherein the first motor is configured to drivably rotate the rod to facilitate linear motion of the at least one laser sub-assembly at a particular linear speed, and the second motor is configured to drivably rotate the drive rod to facilitate rotation of the tubular about the centerline axis at a particular rotational speed in combination with the particular linear speed.

6. The mill scale removal system of claim 1, wherein the at least one laser sub-assembly comprises a suction tube configured to vacuum the removed at least one mill scale layer away from the inner radial surface or the outer radial surface.

7. The mill scale removal system of claim 1, wherein the laser ablation system is a first laser ablation system, with the rod coupled to the first and second vertical arms along the outer radial surface of the tubular and the laser source is mounted on the rod to output the laser with the laser intensity sufficient to remove the at least one mill scale layer formed on the outer radial surface at the particular laser ablation threshold.

8. The mill scale removal system of claim 7, comprising:

at least one third horizontal arm and at least one third roller coupled to the at least one third horizontal arm and configured to at least partially support the tubular by contacting engagement with the inner radial surface at or near the first terminal end of the tubular;

at least one fourth horizontal arm and at least one fourth roller coupled to the at least one fourth horizontal arm and configured to at least partially support the tubular by contacting engagement with the inner radial surface at or near the second terminal end of the tubular; and a second laser ablation system that comprises at least one second laser sub-assembly mounted to the rod and a second motor drivably coupled to the rod, the at least one second laser sub-assembly comprising a second laser source configured to output a second laser having the laser intensity sufficient to remove at least one mill scale layer formed on the outer radial surface at the particular laser ablation threshold.

9. The mill scale removal system of claim 1, comprising a control system communicably coupled to the first and second motors and configured to perform operations comprising:

operating the first motor at a first speed to drive the at least one laser sub-assembly on the rod at a first linear speed between the first and second terminal ends; and operating the second motor at a second speed to drive the at least one rotation roller on the drive rod at a first rotational speed to rotate the tubular about the centerline axis.

10. The mill scale removal system of claim 9, wherein the control system is configured to perform operations comprising:

determining a change to one of the first speed or the second speed; and in response to the determination, adjusting one of the first motor or the second motor to adjust the other of the first speed or the second speed.

11. A method for removing mill scale from a tubular, comprising:

at least partially mounting the tubular on a first adjustable stand comprising at least one first vertical arm, at least one first horizontal arm coupled to the at least one first vertical arm, and at least one first roller coupled to the at least one first horizontal arm such that the at least one first roller contactingly engages an inner radial surface of the tubular at or near a first terminal end of the tubular;

at least partially mounting the tubular on a second adjustable stand comprising at least one second vertical arm, at least one second horizontal arm coupled to the at least one second vertical arm, and at least one second roller coupled to the at least one second horizontal arm such that the at least one second roller contactingly engages the inner radial surface at or near a second terminal end of the tubular;

operating a first motor to drive a rod coupled to the first motor and to at least one laser sub-assembly to linearly move the at least one laser sub-assembly on the rod between the first and second terminal ends;

during linear movement of the at least one laser sub-assembly, operating a laser source of the laser sub-assembly to output a laser having a laser intensity sufficient to remove at least one mill scale layer formed on an outer radial surface of the tubular at a particular laser ablation threshold; and during linear movement of the at least one laser sub-assembly, operating a second motor to drive a drive rod coupled to the second motor and to at least one rotation roller contactingly engaged with the outer radial surface of the tubular to facilitate rotation of the tubular about a centerline axis through rotation of the at least one rotation roller by the drive rod.

12. The method of claim 11, wherein operating the laser source comprises operating the laser source at the laser intensity that is insufficient to alter a material property of a material of the tubular.

13. The method of claim 12, wherein the material of the tubular comprises carbon steel.

14. The method of claim 11, comprising operating the first motor to drivably rotate the rod to linearly move the at least one laser sub-assembly in parallel with the centerline axis between the first and second terminal ends of the tubular.

15. The method of claim 14, comprising:

operating the first motor to drivably rotate the rod to linearly move the at least one laser sub-assembly at a particular linear speed; and operating the second motor to drivably rotate the drive rod to rotate the tubular about the centerline axis at a particular rotational speed in combination with the particular linear speed.

16. The method of claim 11, comprising vacuuming, with a suction tube of the at least one laser sub-assembly, the removed at least one mill scale layer away from the inner radial surface or the outer radial surface.

17. The method of claim 11, wherein the at least one first roller coupled to the at least one first horizontal arm is configured to at least partially support the tubular by contacting engagement with the inner radial surface at or near the first terminal end of the tubular, the at least one second roller coupled to the at least one second horizontal arm is configured to at least partially support the tubular by contacting engagement with the inner radial surface at or near the second terminal end of the tubular, and operating the first motor to drive the rod comprises operating the first motor to drive the rod coupled to the first motor and to at least one laser sub-assembly to linearly move the at least one laser sub-assembly on the rod between the first and second terminal ends along the outer radial surface of the tubular.

18. The method of claim 17, comprising:

at least partially engaging the tubular on at least one third horizontal arm coupled to at least one third roller contactingly engaged with the inner radial surface at or near the first terminal end of the tubular;

at least partially engaging the tubular on at least one fourth horizontal arm coupled to at least one fourth roller contactingly engaged with the inner radial surface at or near the second terminal end of the tubular;

operating the motor to drive the rod coupled to the motor and to at least another laser sub-assembly to linearly move the at least another laser sub-assembly on the rod between the first and second terminal ends; and during linear movement of the at least another laser sub-assembly, operating another laser source of the another laser sub-assembly to output another laser having the laser intensity sufficient to remove at least one mill scale layer formed on the outer radial surface at the particular laser ablation threshold.

19. The method of claim 11, comprising:

operating the first motor at a first speed to drive the at least one laser sub-assembly on the rod at a first linear speed between the first and second terminal ends; and operating the second motor at a second speed to drive the at least one rotation roller on the drive rod at a first rotational speed to rotate the tubular about the centerline axis.

20. The method of claim 19, comprising:

determining a change to one of the first speed or the second speed; and in response to the determination, adjusting one of the first motor or the second motor to adjust the other of the first speed or the second speed.

* * * * *